(12) United States Patent
Watanabe et al.

(10) Patent No.: US 6,665,015 B1
(45) Date of Patent: Dec. 16, 2003

(54) IMAGE SENSING APPARATUS WITH SIMULATED IMAGES FOR SETTING SENSING CONDITION

(75) Inventors: Kazuhiro Watanabe, Tokyo (JP); Yasushi Shiotani, Hayama-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/042,438

(22) Filed: Mar. 13, 1998

(30) Foreign Application Priority Data

Mar. 18, 1997 (JP) .............................................. 9-064439
Mar. 18, 1997 (JP) .............................................. 9-064440
Mar. 18, 1997 (JP) .............................................. 9-064441

(51) Int. Cl.$^7$ .......................... H04M 5/235; G03B 7/00
(52) U.S. Cl. ................. 348/362; 348/333.01; 348/221.1
(58) Field of Search ...................... 348/333.01, 333.02, 348/333.04, 333.05, 333.11, 333.12, 207, 231, 233, 221, 207.99, 231.99, 222.1, 231.7, 362, 221.1; 396/213; 355/68, 77; 358/527

(56) References Cited

U.S. PATENT DOCUMENTS 4,797,712 A * 1/1989 Hayashi et al. ............... 355/38
5,043,816 A * 8/1991 Nakano et al. ......... 348/333.01
5,063,407 A * 11/1991 Takagi .......................... 355/68
5,486,893 A * 1/1996 Takagi .......................... 396/213
5,828,793 A * 10/1998 Mann ........................ 348/222.1
5,966,122 A * 10/1999 Itoh ............................. 348/207
6,028,981 A * 2/2000 Hirasawa et al. ........ 348/207.99
6,097,431 A * 8/2000 Anderson et al. ............ 348/233
6,229,566 B1 * 5/2001 Matsumoto et al. ......... 348/233

FOREIGN PATENT DOCUMENTS

JP          08-32847       *  2/1996

* cited by examiner

*Primary Examiner*—Aung Moe
(74) *Attorney, Agent, or Firm*—Robin, Blecker & Daley

(57) ABSTRACT

An image sensing apparatus having the following functions can be operated in a more easily comprehensible manner to users. A simulation is electrically performed to generate a plurality of images according to various shutter speeds and iris values. The images generated by the simulation are displayed on a touch panel display of the image sensing apparatus. Users can select a final image by touching a desirable image out of a plurality of displayed images on the touch panel display so that a desirable shutter speed and a desirable iris value are determined. A computer program to carry out the above-mentioned functions, is stored in a memory media.

10 Claims, 12 Drawing Sheets

WIDE ANGLE ← [ZOOMING] → TELEPHOTO ANGLE

CLOSE ← [IRIS − DIAPHRAGM] → OPEN

IMAGE SENSING APPARATUS WITH SIMULATED IMAGES FOR SETTING SENSING CONDITION

BACKGROUND OF THE INVENTION

1. Field of the Invention

The present invention relates mainly to an image input system, an image input apparatus, an image input method and its memory media such as a film camera, a camcorder, an electronic still camera and so on.

2. Brief Description of the Related Arts

The term "input device" is defined in general as a "device" that receives a new data and transfers it to a computer for processing it, of which processed result is received again by the device to be stored in media. Accordingly, the image input system and the image input apparatus herein mean, respectively, a system and an apparatus having similar functions to the input device for treating an image signal while the image input method means a method including similar operation steps to the input device for treating the image signal.

Up to now, changing image sensing conditions during sensing images such as a shutter speed, an iris diaphragm value, a zoom ratio etc. has been performed by users' direct manipulation of controlling mechanisms for the shutter, the iris and the zoom. Otherwise, it has been carried out, for instance, by users' selection with reference to typically exemplified images for ideal images, being different from an actually incident image. There has been no such selection technology of the conditions that is performed by predicting various image sensing examples which will be attained by modifying the actual image sensing conditions.

To predict effects that changes in such image sensing conditions as the shutter speed, the iris value, the zoom ratio etc. bring about into images to be sensed hereinafter requires in general a highly technological knowledge. Consequently, in some image input apparatus, general image sensing conditions have been combined and classified into some typical image sensing modes such as "a figure mode", "a landscape mode" etc., which have been subjected to the selection pursued by the users.

However, above-mentioned conventional means cannot predict the user what kind of effects the changes in image sensing conditions bring about into the image that the user is now preparing to sense. As a result, those means cannot always reflect satisfactorily intentions of the camera users.

On the other hand, an extraction of a main subject or a background out of the image has been carried out up to now from an already sensed image. The extraction does not have been performed, for instance, by newly setting the shutter speed or the iris value out of the incident optical image which is just now ready for sensing an image.

In general, the image sensed by the camera and others consists of the main subject and the background, the latter of which is located behind the main subject. When a difference in brightness between the main subject and the background exceeds a latitude of an image plane to be sensed an image, delicate information about brightness and hue of the background is lost in a balance of total image information because an incident light quantity is adjusted adequately in general with respect to the main subject. Even when a color temperature differs between light sources which respectively illuminate the main subject and the background, the color temperature of the background cannot be reproduced because a setting the conditions for a color reproduction is in general carried out being adjusted with respect to the main subject.

Furthermore, when the user intends to confirm a size of the subject in so far input apparatus, the confirmation is carried out in a manner that an object having a known dimension is aligned in parallel to the subject to be sensed the image.

However, to prepare the object having the known dimension is difficult during sensing images. Aligning the object in parallel to the subject is itself difficult even when the subject is floating on air or floating on water.

SUMMARY OF THE INVENTION

The present invention is carried out in circumstances mentioned above. An object of the present invention is to provide an image input apparatus, an image input method and its memory media wherein an image is displayed by a use of an electric simulation technology corresponding to the changes in various image sensing conditions such as in a shutter speed, in an iris value and so on, thereby enabling to supply an easily operational circumstance to a user.

Another object of the present invention is to provide an image input apparatus and an image input method wherein an image can be sensed under the image sensing conditions which are adequate to a main subject and to a background, respectively.

A still another object of the present invention is to provide an image input system, an image input method and its memory media wherein a user can understand easily a size of a subject which is located in a focal position.

The other objects and the other characteristic properties of the present invention will be clarified from the specification and the drawings detailed hereinafter.

DETAILED DESCRIPTION OF THE PREFERRED EMBODIMENTS

Hereinafter detailed are the modes carrying out the present invention into practice with reference to the preferred embodiments. The best mode during carrying out the invention is also described corresponding to the preferred embodiments.

Incidentally, the present invention is carried out into practice not only in a form of an image input apparatus but also in a form of an image input method as well as in a form of memory media loading a computer program which performs the method mentioned above.

Embodiment 1

Figure 1:
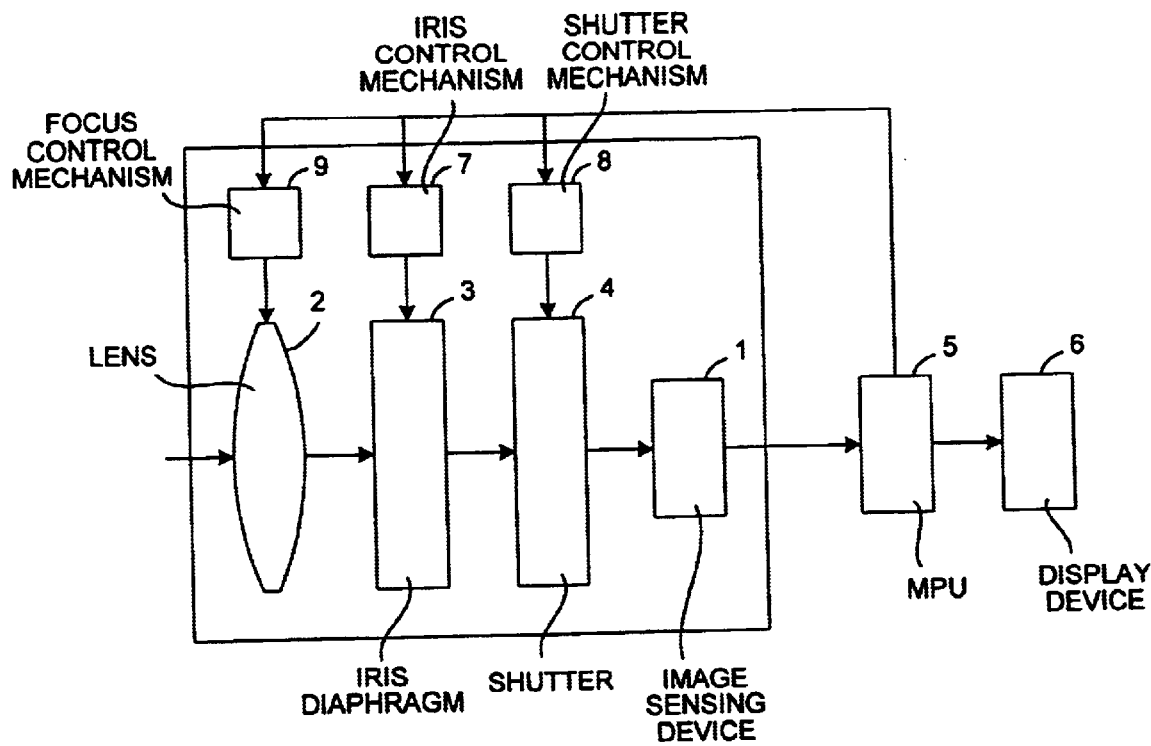
FIG. 1 is a block diagram showing main parts of Embodiment 1 according to the present invention.

FIG. 1 is a block diagram showing a main constitution of a hardware of an image input apparatus of Embodiment 1.

In FIG. 1, an image sensing device 1 generates an electric image signal transformed from an optical image of a subject which is incident through a lens 2, an iris diaphragm 3 and a shutter 4 and is focused on the image sensing device 1. Aforesaid image signal is subjected to an arithmetic processing on a microprocessor unit (referred to as "MPU" hereinafter) 5 to be displayed on a display device 6.

An iris value, a shutter speed and a focal distance are controlled respectively by an iris control mechanism 7, a shutter control mechanism 8 and a focus control mechanism 9.

Figure 2:
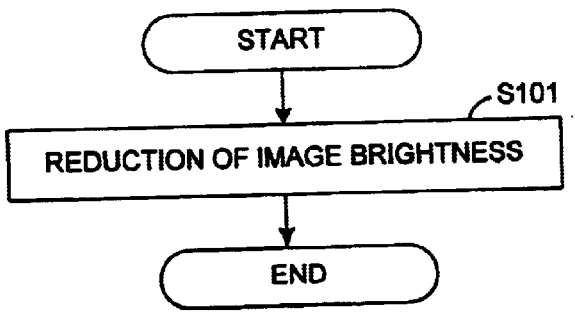
FIG. 2 is a flow chart showing operations of Embodiment 1 when a shutter speed is accelerated.

FIG. 2 is a flow chart for illustrating an example of simulation procedures in the present embodiment when the shutter speed is accelerated.

When the shutter speed is accelerated, the arithmetic processing which reduces a brightness of a whole image is performed in the MPU 5 (Step 101) because an optical quantity of a light illuminating the image sensing device 1 decreases.

Figure 3:
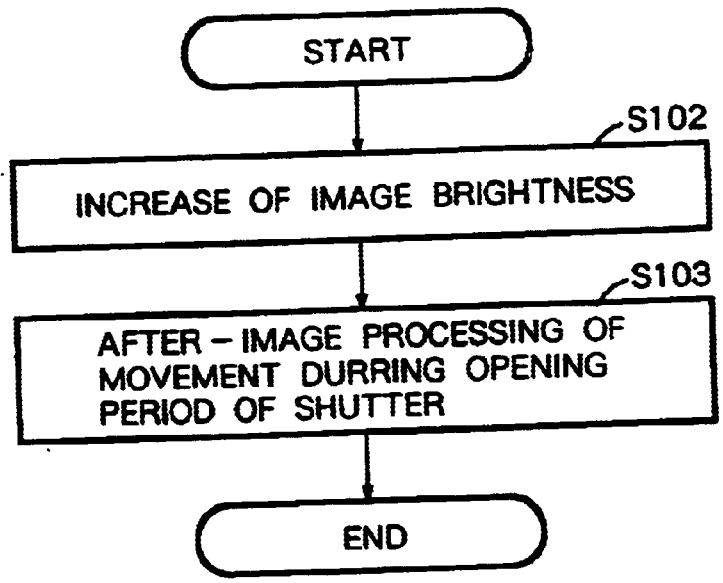
FIG. 3 is a flow chart showing operations of Embodiment 1 when a shutter speed is decelerated.

FIG. 3 is a flow chart for illustrating another example of simulation procedures in the present embodiment when the shutter speed is decelerated.

When the shutter speed is decelerated, the quantity of the light illuminating the image sensing device 1 increases. On the other hand, a motion of a subject induces a blurred picture image corresponding to a moving distance that the subject moves during a period of time when the shutter is opened. As a result, the brightness of the whole image is increased (Step 102) and the moving distance of the subject during the assumed shutter speed is displayed as an after-image (Step 103) on the MPU 5.

Figure 4:
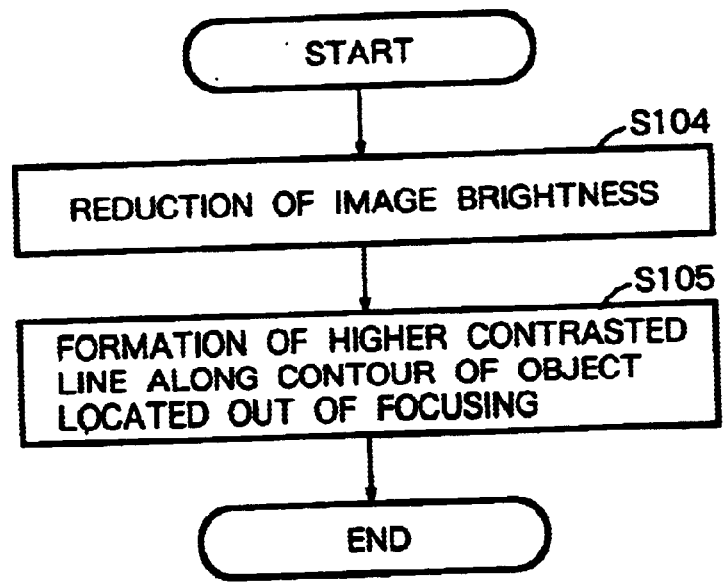
FIG. 4 is a flow chart showing operations of Embodiment 1 when an iris diaphragm is narrowed.

FIG. 4 is a flow chart for illustrating an example of simulating procedures of the image obtainable when the opening of the iris is reduced to be at more closed status in the present embodiment. When the opening of the iris is reduced, the quantity of the incident light to the image sensing device 1 is reduced. On the other hand, the images of the subjects which are located before and behind the focal distance turn comparatively clearer because a depth of field turns deeper. Consequently, in the MPU 5, the brightness of the whole image is reduced (Step 104) while lines having higher contrasts are formed on both sides of contouring lines of the subjects which are located before and behind the focal distance (Step 105).

Figure 5:
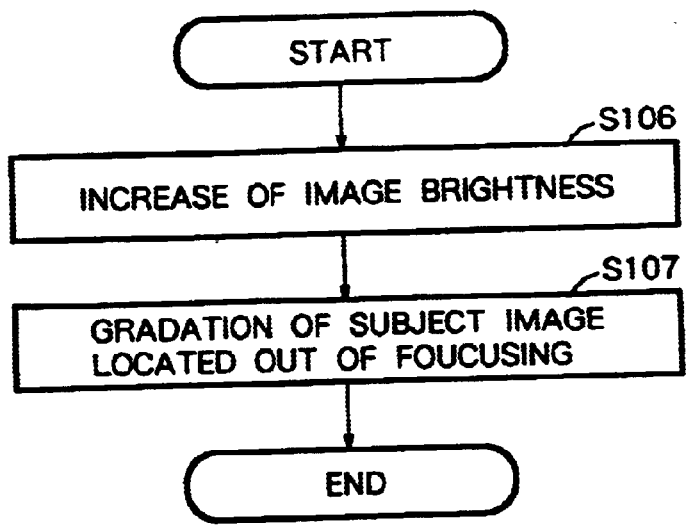
FIG. 5 is a flow chart showing operations of Embodiment 1 when an iris is widened.

FIG. 5 is a flow chart for illustrating an example of simulating procedures of the image obtainable when the opening of the iris is widened in the present embodiment. When the opening of the iris is changed to be at an "iris-in" status, the quantity of the incident light to the image sensing device 1 is increased. On the other hand, the images of the subjects which are located before and behind the focal distance turn more blurring because a depth of field turns shallower. As a result, the MPU 5 increases the brightness of the whole image (Step 106) while the MPU 5 vignettes the images of the subjects which are located before and behind the focal distance (Step 107).

Figure 6:
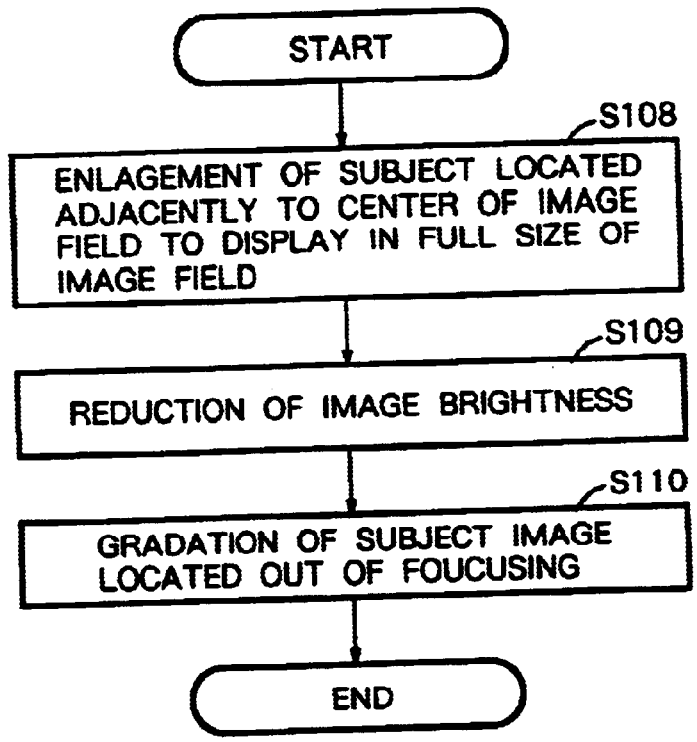
FIG. 6 is a flow chart showing operations of Embodiment 1 when a zoom ratio is enlarged.

FIG. 6 is a flow chart for illustrating an example of simulating procedures of the image obtainable when the zoom ratio is enlarged (referred to as "zoom-in" hereinafter) in the present embodiment. When the zoom ratio is enlarged, the image is enlarged. On the other hand, the quantity of the incident light to the image sensing device 1 decreases. Furthermore, the images of the subjects which are located before and behind the focal distance turn blurring. Consequently, in the MPU 5, the images located in a vicinity of a center of an image field are enlarged to be displayed in an almost full size of a display frame (Step 108), the brightness of the whole image is reduced (Step 109) and the images of the subjects which are located before and behind the focal distance are blurred (Step 110).

Incidentally, because an electric predicting of an image which is obtainable when the zoom ratio is lowered is difficult, the images having the different values in zoom ratio are predicted from an optically attained image having a smallest zoom ratio (an image sensed at a widest angle).

As mentioned above, when the image sensing conditions (the shutter speed, the iris value and the zoom ratio) are varied, the present embodiment electrically simulates and displays the images so that the users can easily predict the images obtainable under the varied conditions and can easily decide the best image sensing condition.

Herein a set up of the image sensing condition may be performed by use of so far methods wherein various sorts of switches are manipulated or by use of technologies wherein one of the simulated images displayed on the displayed panel such as the touch panel is specified by the mouse or a cursor.

Embodiment 2

In Embodiment 1, the image sensing condition is adequately decided with reference to the simulated image. In the present embodiment, the condition under which an image is to be sensed is decided by pointing out a favorite picture image out of a plurality of picture images which are simulated under a plurality of image sensing conditions.

Though a main constitution of the present embodiment is almost the same as that of Embodiment 1, it is dissimilar to that of Embodiment 1 on the point that a touch panel or touch screen provided on a surface of the display device 6 serves as an image input means for specifying the image sensing condition.

Figure 7:
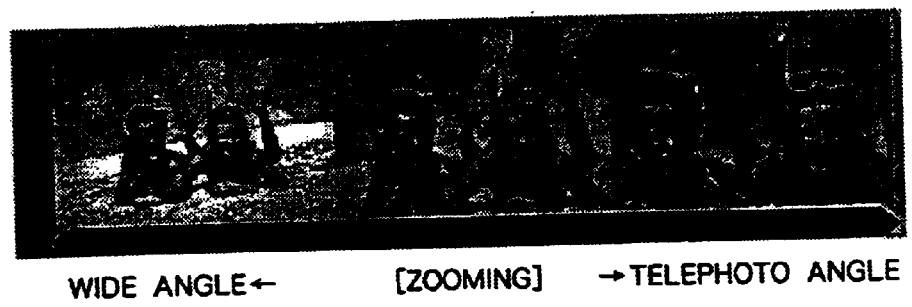
FIG. 7 is a photograph showing an exemplified simulated image displayed by a display means in Embodiment 2.

FIG. 7 shows an example of the display statuses wherein the images simulated depending on the various zoom ratios are displayed on the display device 6 so that the users can selectively specify one condition. In FIG. 7, the display field is partitioned laterally into three portions, on a left-hand side of which the optical image incident at present to the image sensing device 1 is displayed. The zoom ratios of the simulated images increase as their displayed positions go from the left to the right.

Figure 8:
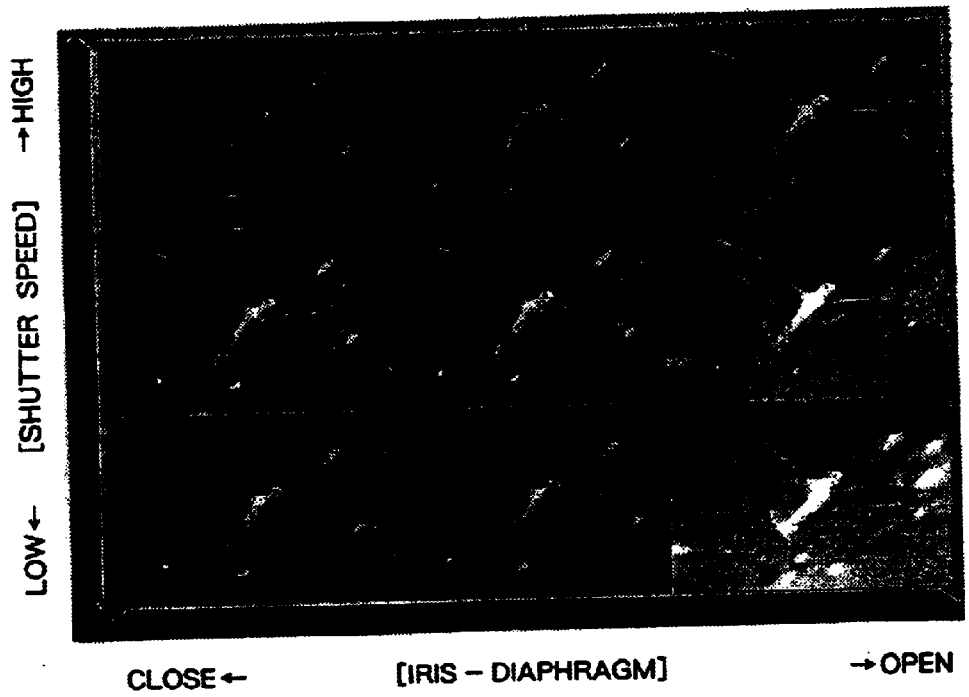
FIG. 8 is another photograph showing another exemplified simulated image displayed by another display means in Embodiment 2.

FIG. 8 shows another example of the display status wherein the images simulated depending on the various shutter speed and the iris values are displayed on the display panel 6 so that the users can selectively specify the condition. In FIG. 8, the display field is partitioned laterally into three portions, vertically also into three portions and into nine portions in total, on a center of which the optical image incident at present to the image sensing device 1 is displayed. Around that, the images simulated under the various conditions are displayed. The shutter speeds of the simulated images increase along an ordinate of the display field while the iris values of the simulated images decrease (widened) along an abscissa of the display field.

Figure 9:
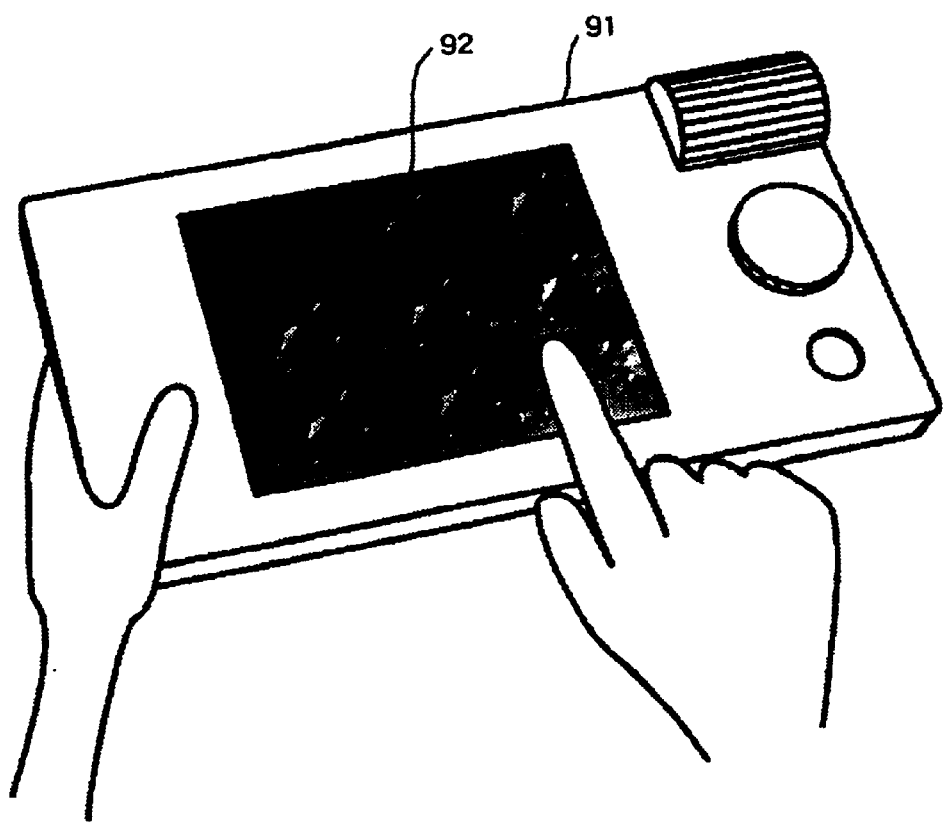
FIG. 9 is a perspective view of a constitution shown in Embodiment 2.

FIG. 9 shows still another example of the display statuses wherein a plurality of the images simulated depending on the various shutter speeds and the various iris values are displayed on a display field 92 of an image input apparatus 91 of the present embodiment so that the users can selectively specify the image sensing condition by use of the touch panel.

Because the users can compare and refer to a plurality of the images simulated under a plurality of the image sensing conditions which differ from each other as mentioned above in the present embodiment, the users can not only carry out predicting a sensed image but also easily decide a desired image sensing condition by pointing out the favorite image utilizing a finger tip.

Herein a pointing device such as a mouse may be used to move the cursor on the display field to select the desired image instead of the touch panel, the touch screen and the touch tablet.

Though the respective embodiments mentioned above simulate electrically only when the shutter speed, the iris value and the zoom rate are varied, the electric simulation may be performed when a discharge timing of a stroboscopic flashlight is varied beside above. Namely, the simulation is carried out to predict the sensed images when the stroboscopic flashlight is discharged just after the shutter is opened as well as when the stroboscopic flashlight is discharged just before the shutter is closed, respectively, under a slow shutter speed condition. Both images are subjected to users' selection enabling to make users' intentions reflect on results.

Because changes in image sensing conditions such as the shutter speed, the iris value and the zoom ratio can be performed predicting enough what kind of effects the changes will bring about into the image to be sensed as an image as mentioned in Embodiments 1 and 2, the invention can provide the users with a remarkably easily understandable operational environment.

Embodiment 3

Figure 10:
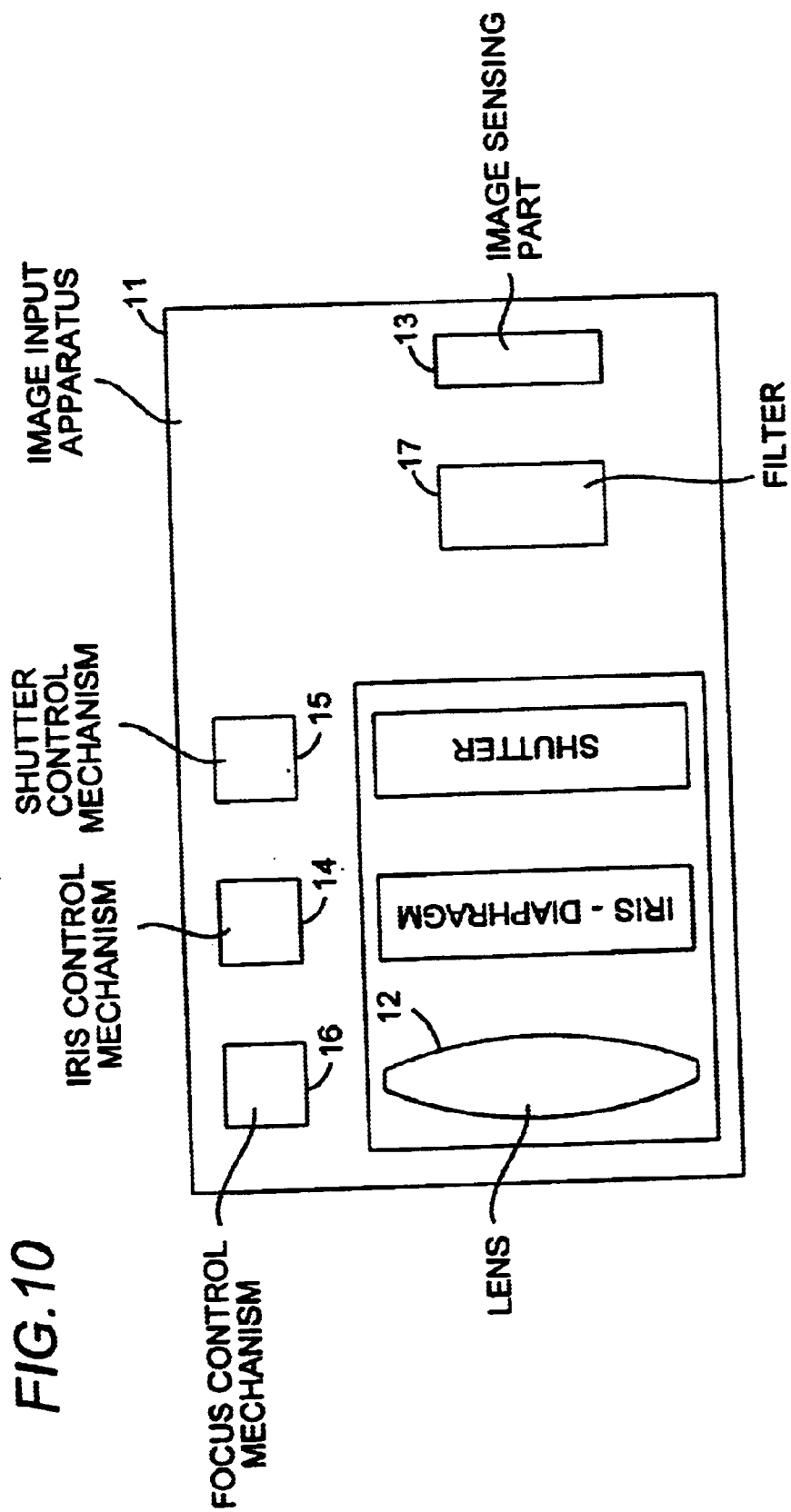
FIG. 10 is a block diagram showing a constitution of Embodiment 3.

FIG. 10 shows a main constitution of "an image input apparatus" of Embodiment 3. Incidentally, the present embodiment described hereinafter can be carried out into practice not only as an apparatus but also as a method.

In FIG. 10, a numeric sign 11 stands for the image input apparatus wherein an optical image incident through a lens 12 is projected onto an image sensing part 13. Here a charge coupled device (referred to as "CCD" hereinafter) located at the image sensing part 13 transforms the optical image into an image signal. The iris value, the shutter speed and the focal distance of the lens 12 are controlled by an iris control mechanism 14, a shutter speed control mechanism 15 and a focus control mechanism 16, respectively. A filter 17 is to cut-off a low frequency component included in the image signal. If the filter is a sort of optical filters, it is inserted between the lens 12 and the image sensing part 13.

Figure 11:
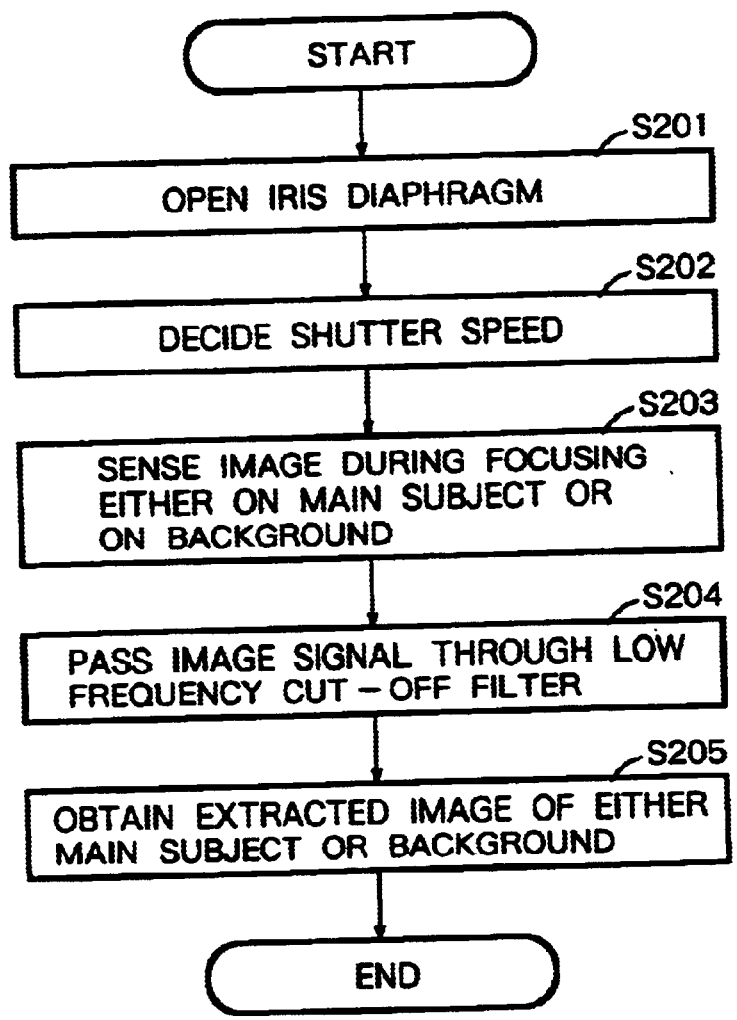
FIG. 11 is a flow chart showing operations of Embodiment 3.

FIG. 11 is a flow chart illustrating operations of the present embodiment. All process steps described in this flow chart are performed by a central processor unit (referred to as "CPU" hereinafter) unshown in FIG. 10 which is loaded on the image input apparatus 11. Hereinafter the operations of the present embodiment will be described with reference to this flow chart. First, the iris is fully opened by the iris control mechanism 14 (Step 201). Then the shutter speed is decided by the shutter speed control mechanism 15 so that an adequate exposure quantity is obtainable under the open iris condition (Step 202). On that status, an image signal is sensed during focusing either on a main subject or on a background (Step 203). The image signal is passed through a low frequency cut-off filter (Step 204) to produce another image signal which contains information only about either the main subject or the background (Step 205). If the low frequency cut-off filter is an optical filter 17 as shown in FIG. 10, it can extract either the main subject or the background without any electric filtering processing.

It is known in general that the images of the subjects located remote from a focal point turn blurred when the depth of field is shallowed and the focusing is performed on a specified point located on an optical axis. The image information generated from the blurred area of the image exhibits a gradually varying brightness having a lower frequency component along a scanning direction so that the blurred information can be cut off by either the optical or the electrical filter, which can easily extract either the main subject or the background as mentioned above.

The depth of field turns shallowest when the iris is wholly opened. An excess quantity of the light which is induced by opening the iris (an iris in status) can be compensated to be an adequate value either if the shutter speed is accelerated to shorten an exposure time or if the incident light is passed through an inserted neutral density (referred to as "ND" hereinafter) filter.

When the image of the main subject is extracted, the exposure time is decided with respect to the main subject portion, usually on a central portion of the image field, to obtain the adequate exposure value. When the image of the background is extracted, the exposure time is decided with respect to the background portion, usually on peripheral portions of the image field, to obtain the adequate exposure. Similarly, when the image of the main subject is extracted, a color tone is balanced to provide a white color on the main subject portion to obtain an adequate hue reproduction. When the image of the background is extracted on the contrary, the color tone is balanced to provide the white color on the background portion to attain the adequate hue reproduction.

As mentioned above, both the main subject and the background can be sensed images under adequate image sensing conditions, respectively.

Embodiment 4

Figure 12:
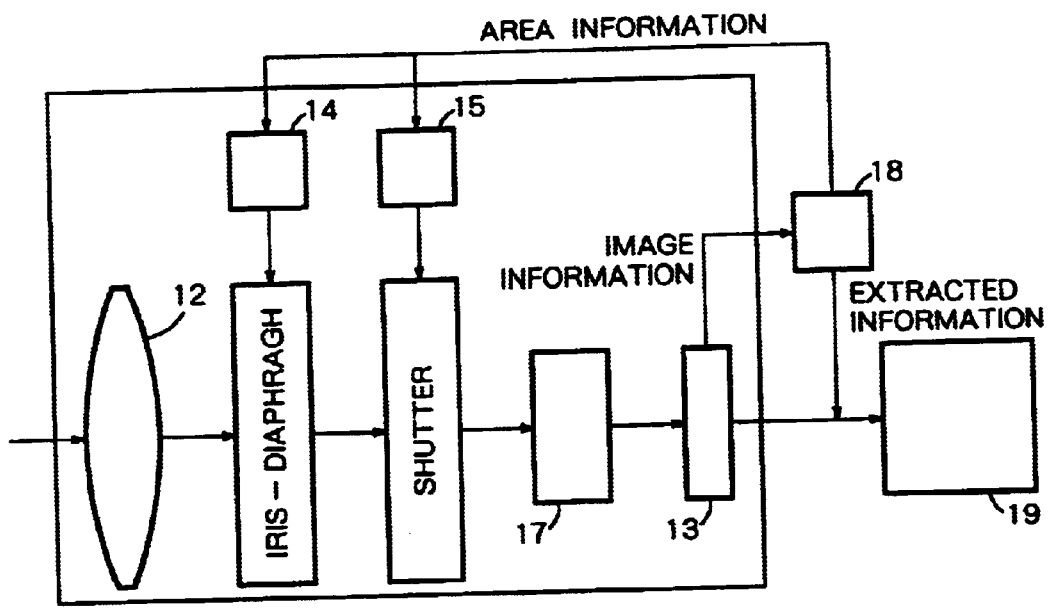
FIG. 12 is a block diagram showing a constitution of Embodiment 4.

FIG. 12 is a block diagram showing a main constitution of "an image input apparatus" in the present embodiment. In FIG. 12, a numeric sign 18 stands for a contour detecting mechanism for detecting a contour located between the main subject and the background to divide an output image from the image sensing part 13 into the image of the main subject and that of the background, respectively. The mechanism 18 further recognizes regionally the divided images respectively to re-apply a new input image signal with adequate values such as the quantity of the light, the color temperature etc. which are adequate to the respective regions. Information of the new image is then separated again into those of the main subject and of the background to transmit as respective information to a circuit block located on a following stage such as a memory 19. The same numeric signs beside aforesaid of FIG. 12 as those shown in FIG. 10 indicate herein the same constituents of FIG. 10 so that the description is omitted.

Figure 13:
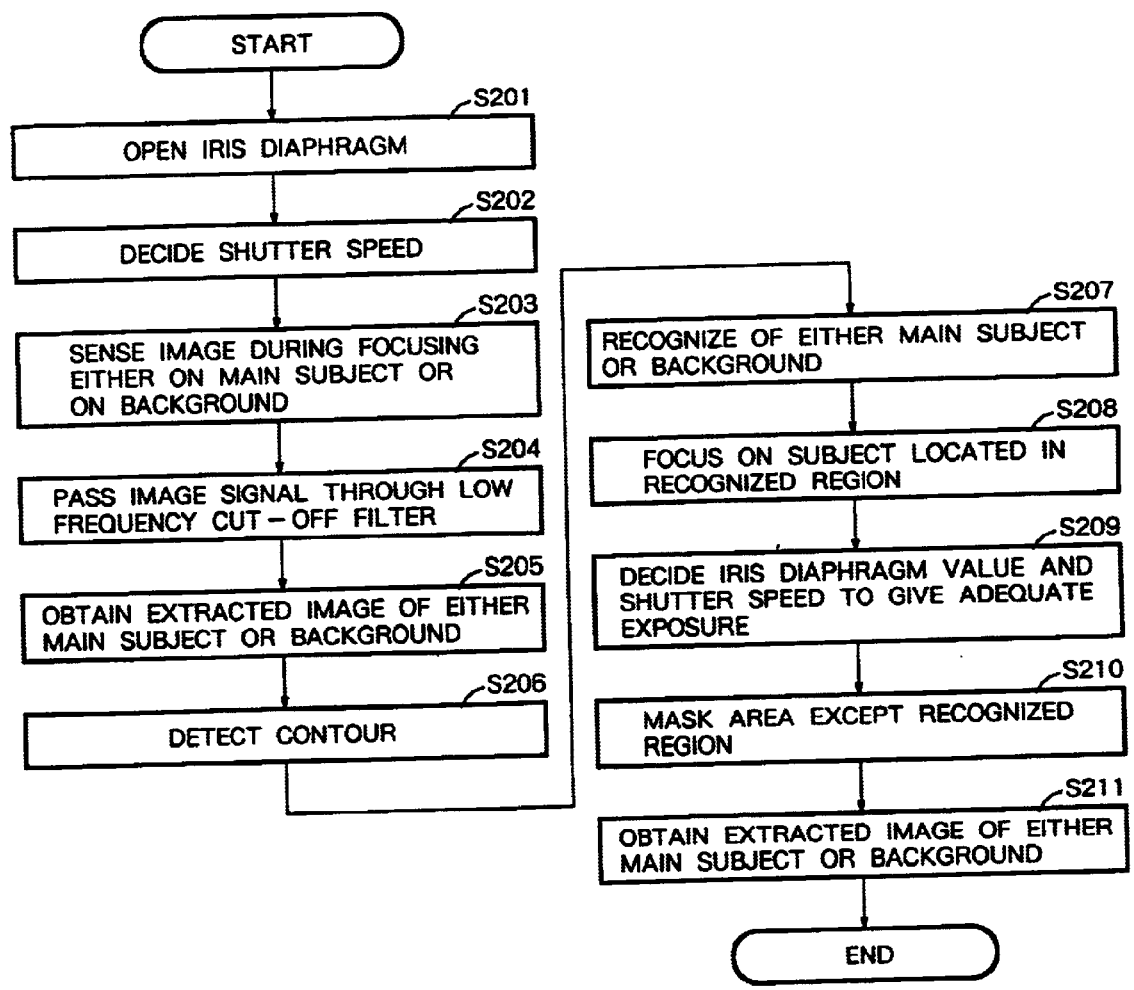
FIG. 13 is a flow chart showing operations of Embodiment 4.

FIG. 13 is a flow chart showing operations of the present embodiment. Hereinafter described are the operations of the present embodiment with reference to this flow chart. First, an iris control mechanism 14 is driven to make an iris value minimum (fully open) (Step 201). Then a shutter speed control mechanism 15 operates to control a shutter speed so as to attain an adequate light quantity with respect to above-mentioned iris value (Step 202). Next, an image is sensed being focused either on a main subject or on a background (Step 203). The obtained image is processed by passing the image signal through a low frequency cut-off filter (Step 204) to generate an extracted image of either the main subject or the background (Step 205). This image is then subjected to the contour detecting operation (Step 206) to recognize the region of either the main subject or the background (Step 207). Focusing is performed on a subject located within one of aforesaid regions (Step 208), which is followed by controlling the iris value and shutter-speed so that an adequate light quantity is incident to the subject located within that region (Step 209). The area outside this region is masked (Step 210) to produce the extracted image of either the main subject or the background (Step 211).

In case of necessity, a color correction performed either on the main subject or on the background may provide an adequate color reproduction.

As mentioned above, the present embodiment can sense images of the main subject and the background both on an adequate status in exposure light quantity, which can afford an adequate color reproduction. Furthermore, because the extraction is performed during masking the areas located outside the recognized region so that image applications such as an elimination of the background, a combination of the main subject and a quite different background etc. turn easily available.

Incidentally, though Embodiments 3 and 4 are described about an extraction mode of the image, the iris value and the shutter speed can be specified either manually or by programming to perform sensing images in an ordinary image sensing mode, during eliminating the optical or the electrical low frequency cut-off filter.

As mentioned above, the configurations of Embodiments 3 and 4 can provide the main subjects and the background with the respective images extracted respectively under adequate image sensing conditions, which can not only compensate both a narrow latitude in exposure and a low reproducibility in color but also guarantee the image applications such as the elimination of the background, the combination of the main subject and the different background etc.

Embodiment 5

Figure 14:
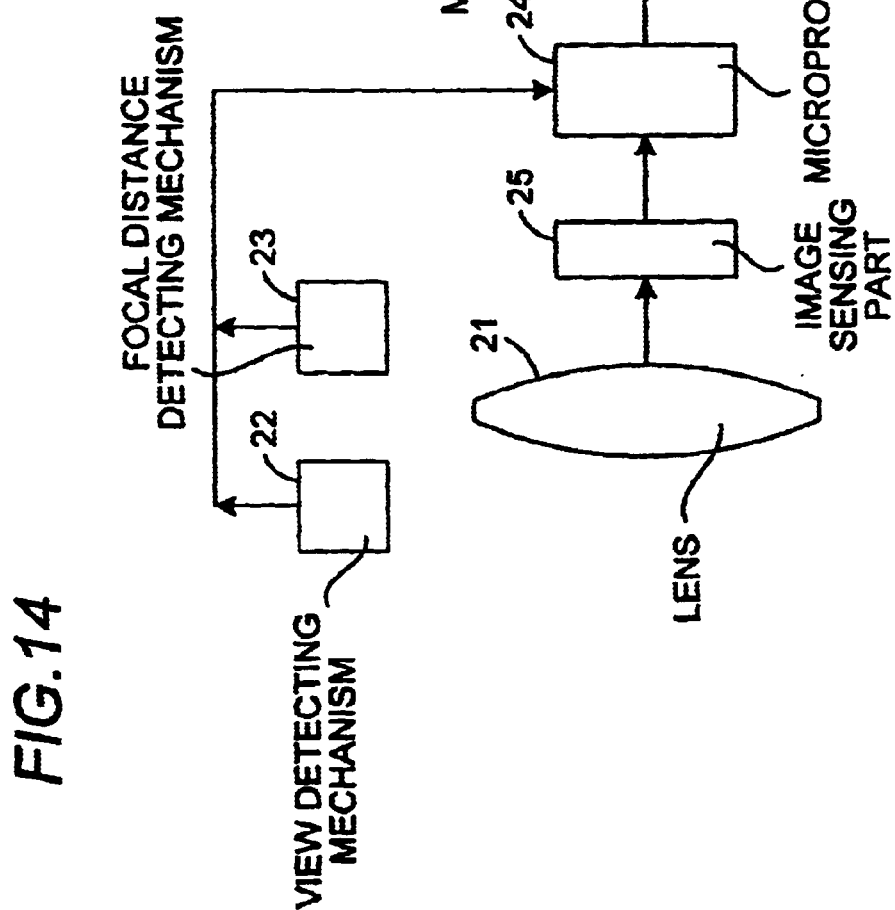
FIG. 14 is a block diagram showing a constitution of Embodiment 5.

FIG. 14 is a block diagram showing main constituents of "an image input apparatus" of Embodiment 5. Although the present embodiment assumes a stand alone type apparatus, the present invention is not restricted to the stand alone type apparatus but can be carried out into practice in a form of a system wherein functional constituents are connected as a line or in a network, further in a form of a method and still further in a form of memory media loading a computer program for realizing the method.

In FIG. 14, numeric sign 21 stands for a lens for sensing an image of which angle of view is detected by an angle of view detecting mechanism 22 and of which focal distance is detected by a focal distance detecting mechanism 23, respectively. In a microprocessor 24, scale (otherwise called "gauge") information is produced from angle of view information and from focus distance information. They are transmitted to a circuit block such as a memory 26 located in a following stage, together with image information recognized tin an image sensing part 25.

The gauge information transferred from the memory 26 generates gauge information to be synthesized with the subject image in another microprocessor 27, which is displayed on a display device 28.

Figure 15:
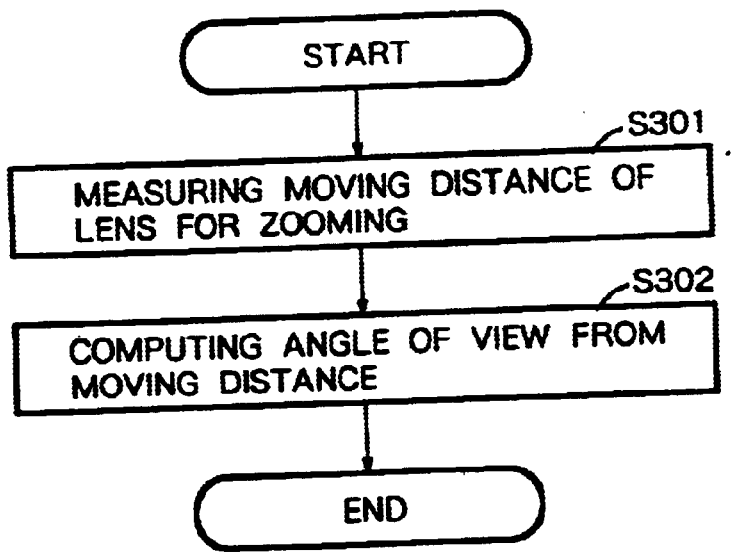
FIG. 15 is a flow chart showing operations of Embodiment 5.

FIG. 15 is the flow chart showing an exemplified method for detecting the angle of view in the present embodiment. If the lens is a so called single focus lens, the angle of view value of the lens is predetermined as a property characteristic to the lens. On the other hand, if the lens is a sort of zoom lens, the lens has structurally moving portions to perform a zoom operation. Accordingly, a moving distance is first detected (Step 301). The angle of view value is obtained either by computing from the detected moving distance or by retrieving preliminarily measured angle of view values with respect to the detected moving distance value (Step 302).

Figure 16:
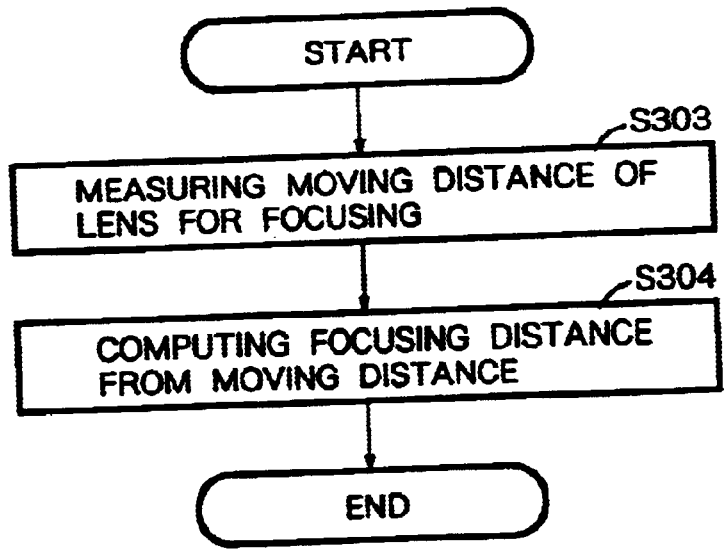
FIG. 16 is another flow chart showing another operations of Embodiment 5.

FIG. 16 is the flow chart showing another exemplified method for detecting the focusing distance. Because the lens has structurally moving parts for focusing, the moving distance of the parts is detected first (Step 303). The focusing distance is obtained either by computing from the detected moving distance or by retrieving preliminarily measured moving distance with respect to the detected moving distance (Step 304).

If, otherwise, an image input apparatus for sensing an image which is provided with an automatic focusing mechanism directly measures the distance to the subject, the automated focusing mechanism can directly provide the focusing distance.

Figure 17A:
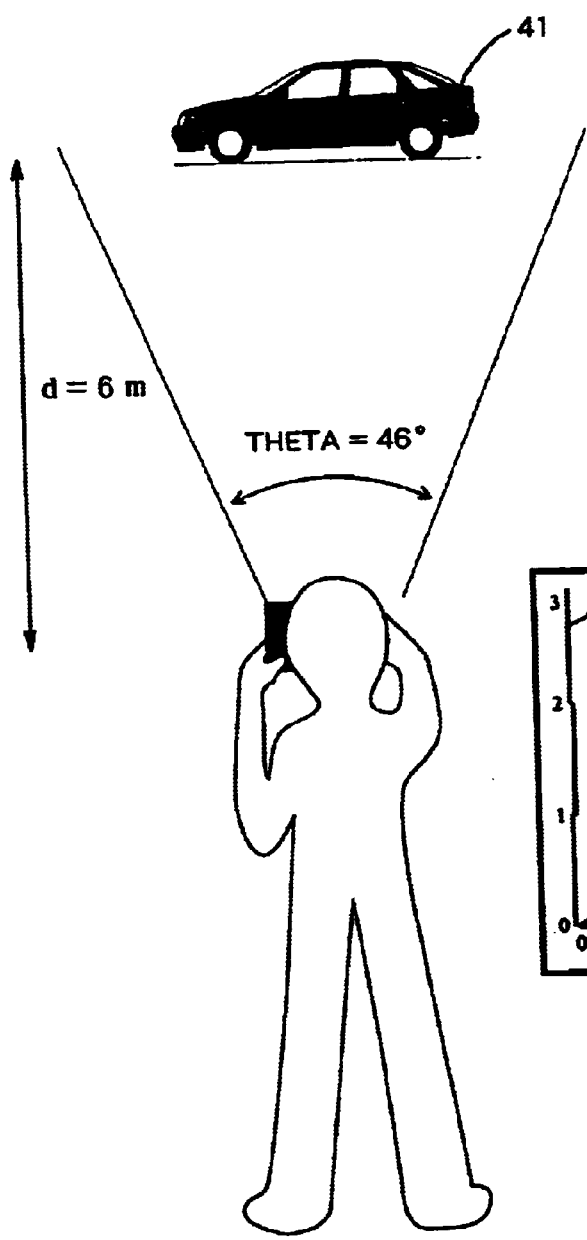
FIG. 17A is a view for illustrating Embodiment 5.
Figure 17B:
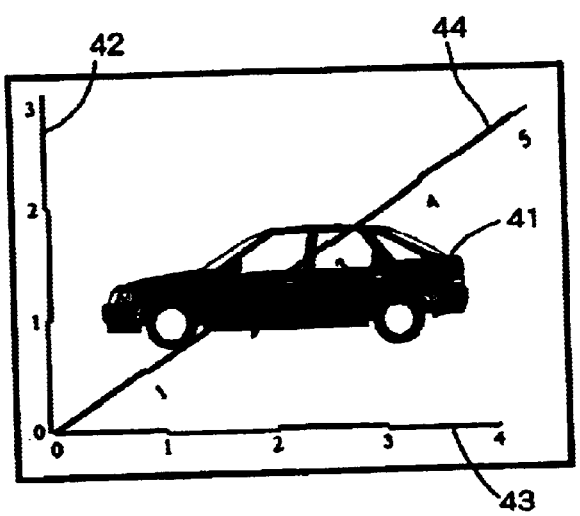
FIG. 17B is another view for illustrating Embodiment 5.

FIGS. 17A and 17B are views for illustrating the present embodiment. In FIG. 17A, an automobile 41 located at 6 meters (referred as to "m" hereinafter) distant from the image input apparatus is sensed an image having 46° as the angle of view THETA during focusing. A diagonal length of a rectangular image frame which is in parallel to the image plane located at the focused distance is calculated herein as follows:

6 m×tan 23°×2=approximately 5.1 m

This diagonal length corresponds to a line 44 of a graph shown in FIG. 17B. The gauge images 42, 43 and 44 are generated depending on that value. A complex image is synthesized out of above-mentioned images and the subject image of the automobile 41 to be displayed on a display means.

The gauges which are copied in a horizontal, in a vertical or in an arbitrary direction of the subject image can serve as a gauge for confirming a size of the subject image as mentioned above.

As described so far, the size of the focused subject in Embodiment 5 can be easily confirmed by comparing the subject with the gauge image which indicates the dimensions of substance located in the focal position.

What is claimed is:

1. An image sensing apparatus, comprising:

an image sensing device adapted to sense an image of a subject;

a shutter speed simulating device adapted to simulate a plurality of images each of which is produced by performing an arithmetic processing so as to reduce a brightness of the whole image when said shutter speed simulating device simulates the image at a fast speed or performing the arithmetic processing so as to increase the brightness of the whole image when said shutter speed simulating device simulates the image at a low speed based on a signal of the single image sensed by said image sensing device;

a display device adapted to display the simulated plurality of images; and a setting device adapted to set an image sensing condition corresponding to a simulated image of the simulated plurality of images selected by a user to perform a next sensing operation of said image sensing apparatus.

2. The image sensing apparatus according to claim 1, wherein the simulated image is selected by using a touch panel provided on a display surface.

3. The image sensing apparatus according to claim 1, wherein:

the image of the moving subject is displayed as a blurry image corresponding to a moving distance that the subject moves during a period of time when the shutter is opened.

4. An image sensing method, comprising steps of:

sensing an image of a subject;

simulating a shutter speed;

simulating a plurality of images each of which is produced by performing an arithmetic processing so as to reduce a brightness of the whole image when said simulated shutter speed is at a fast speed or performing the arithmetic processing so as to increase the brightness of the whole image when said simulated shutter speed is at a low speed based on a signal of the single image sensed by said image sensing step;

displaying the simulated plurality of images; and setting an image sensing condition corresponding to a simulated image of the simulated plurality of images selected by a user to perform a next sensing operation.

5. Memory media loading a computer program which carries out the image sensing method according to claim 4 into practice.

6. The image sensing method according to claim 4, further comprising a step of:

displaying the image of the moving subject as a blurry image corresponding to a moving distance that the subject moves during a period of time when the shutter is opened.

7. An image sensing apparatus, comprising:

an image sensing device adapted to sense an image of a subject;

an iris value simulating device adapted to simulate a plurality of images each of which is produced by performing an arithmetic processing so as to form lines having higher contrasts on both sides of contouring lines of the subjects before and behind a focal distance of said image sensing device when said iris value simulating device simulates the image at an iris-closed status or performing the arithmetic processing so as to blur contouring lines of the subjects before and behind the focal distance when said iris value simulating device simulates the image at an iris-widened status based on a signal of the single image sensed by said image sensing device;

a display device adapted to display the simulated plurality of images; and a setting device adapted to set an image sensing condition corresponding to a simulated image of the simulated plurality of images selected by a user to perform a next sensing operation of said image sensing apparatus.

8. The image sensing apparatus according to claim 7, wherein:

An arithmetic processing is performed so as to reduce a brightness of the whole image when said iris value simulating device simulates the image at the iris-closed status or the arithmetic processing is performed so as to increase the brightness of the whole image when said iris value simulating device simulates the image at the iris-widened status.

9. An image sensing method, comprising steps of:

sensing an image of a subject;

simulating an iris value;

simulating a plurality of images each of which is produced by performing an arithmetic processing so as to form lines having higher contrasts on both sides of contouring lines of the subjects before and behind a focal distance of said image sensing device when said simulated iris value is at an iris-closed status or performing the arithmetic processing so as to blur contouring lines of the subjects before and behind the focal distance when said simulated iris value is at an iris-widened status based on a signal of the single image sensed by said image sensing device;

displaying the simulated plurality of images; and setting an image sensing condition corresponding to a simulated image of the simulated plurality of images selected by a user to perform a next sensing operation of said image sensing apparatus.

10. The image sensing method according to claim 9, further comprising a step of:

performing an arithmetic processing so as to reduce a brightness of the whole image when said simulated iris value is at the iris-closed status or performing the arithmetic processing so as to increase the brightness of the whole image when said iris value simulating device simulates the image at the iris-widened status.

* * * * *

UNITED STATES PATENT AND TRADEMARK OFFICE
CERTIFICATE OF CORRECTION

PATENT NO. : 6,665,015 B1
DATED : December 16, 2003
INVENTOR(S) : Kazuhiro Watanabe It is certified that error appears in the above-identified patent and that said Letters Patent is hereby corrected as shown below:

Column 8,
Line 51, delete "460" and insert -- 46° --.

Signed and Sealed this

Fourteenth Day of February, 2006

JON W. DUDAS
*Director of the United States Patent and Trademark Office*